(No Model.)
2 Sheets—Sheet 1.

J. T. EMERSON.
STUMP EXTRACTOR.

No. 536,424. Patented Mar. 26, 1895.

Witnesses:
Inventor:
John T. Emerson
by Higdon and Higdon and Longan
Attys.

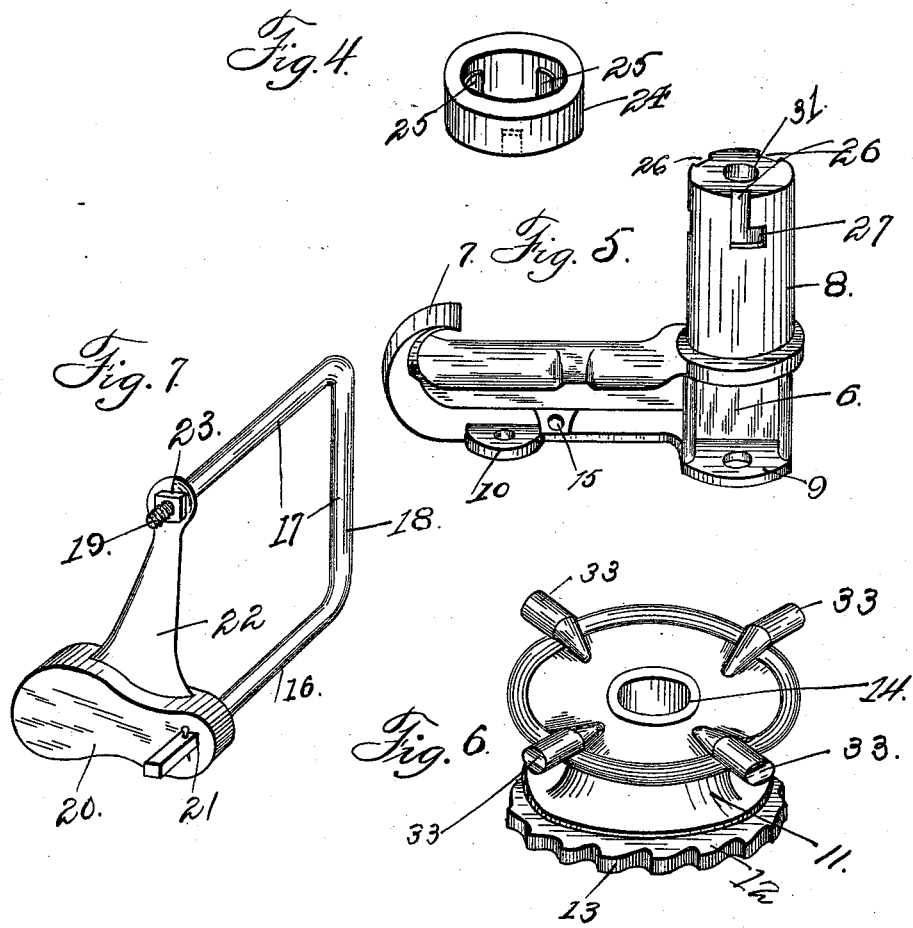

UNITED STATES PATENT OFFICE.

JOHN T. EMERSON, OF OTTUMWA, IOWA.

STUMP-EXTRACTOR.

SPECIFICATION forming part of Letters Patent No. 536,424, dated March 26, 1895.

Application filed July 16, 1894. Serial No. 517,663. (No model.)

*To all whom it may concern:*

Be it known that I, JOHN T. EMERSON, of the city of Ottumwa, Wapello county, State of Iowa, have invented certain new and useful Improvements in Stump-Extractors, of which the following is a full, clear, and exact description, reference being had to the accompanying drawings, forming a part hereof.

My invention relates to an improved stump and grub extractor, and consists in the novel construction, combination and arrangement of parts, hereinafter specified and designated in the claims.

The object of my invention is to construct an improved stump extractor that will be efficient and complete in its workings and that can be easily moved from one place to another, said stump extractor to possess superior advantages in point of simplicity, durability and general efficiency.

Figure 1:
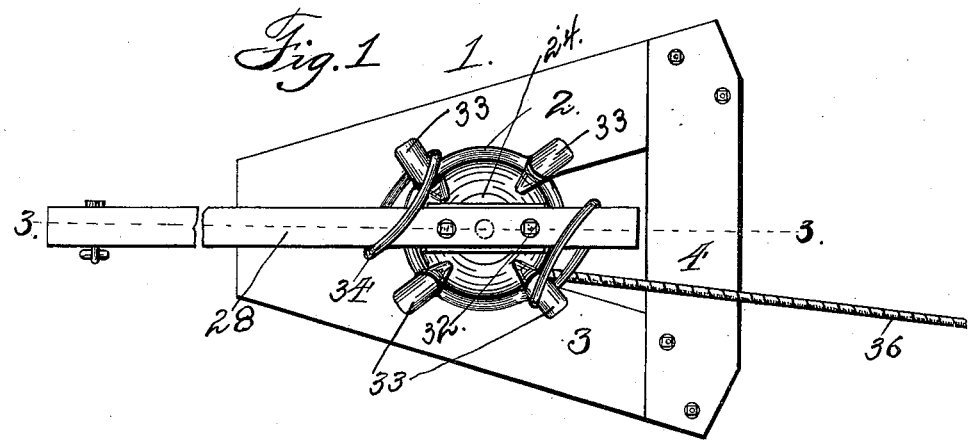
Figure 2:
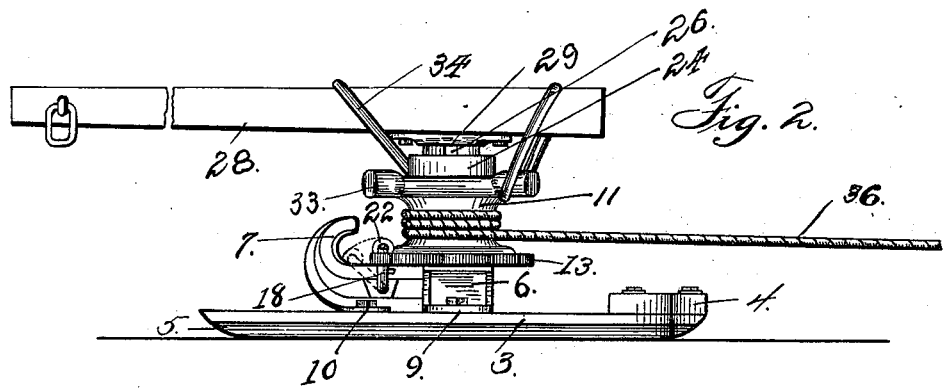
Figure 3:
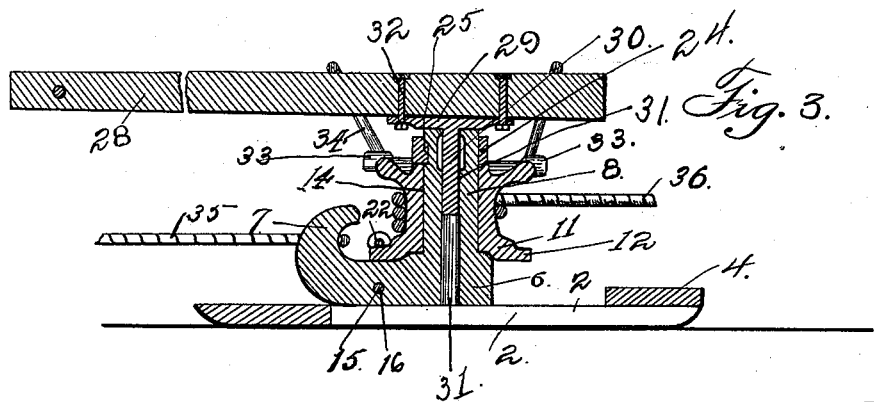

Referring to the drawings: Figure 1 is a top plan view of my improved stump and grub extractor, Fig. 2 being a side elevation thereof. Fig. 3 is a longitudinal sectional view taken on the indicated line 3—3 of Fig. 1. Fig. 4 is a perspective view of a locking ring made use of in carrying out my invention. Fig. 5 is a perspective view of the main casting of my improved stump and grub puller, having the hook and central shaft formed integral therewith. Fig. 6 is a perspective view of the winding spool. Fig. 7 is a perspective view of the weighted double pawl I make use of in carrying out my invention.
Referring by numerals to the accompanying drawings, 1 indicates the base or skids on which the main base casting of my improved stump puller is bolted. This base is preferably formed of heavy timbers 2 and 3 mortised and firmly held together at their forward ends in any suitable manner, and have bolted to their rear ends the cross-timber 4. The outer edges of these timbers 2, 3 and 4 are rounded, as indicated by the numeral 5.
This allows the base 1 to be readily moved in any direction.

6 indicates the base casting which is made sufficiently heavy for the work required of it, and has formed integral with the forward end a hook 7. A vertical hollow spindle 8 extends upwardly from this base 6 and projecting ears 9 on either side of this vertical spindle 8 serve as a means for bolting this base casting to the skids, or frame work 1. Ears 10 near the forward end of the base casting and adjacent the hook 7 thereof serve to more firmly bolt the base casting to the skids.

Mounted upon the hollow spindle 8 is a spool 11, said spool being provided with an extending flange 12, said flange having a series of peripherally hooked teeth 13 projecting in a horizontal plane adjacent the base casting 6. The spool 11 is provided with a central vertical bore 14 which loosely engages the spindle.

Formed transversely in the base casting 6 is a passage or aperture 15, in which is loosely mounted the horizontal portion 16 of the double pawl 17. This portion 16 of the pawl which lies within the passage 15 is preferably circular in cross-section so that it may rock and rotate therein.

The vertical portion 18 of the pawl 17 is adapted to engage with the teeth 13 on the lower flange 12 of the spool 11. From thence it is bent laterally across the upper edges of the teeth 13 to the opposite side of the base casting 6, and has its end 19 screw-threaded.

A weighted arm 20 provided with an angular horizontal passage 21 is keyed to the squared portion of the arm 16 of the pawl 17. A vertical extension 22 on this weighted arm 20 is provided with an aperture in its upper portion, through which the screw-threaded end 19 of the pawl 17 passes. A nut 23 engages this screw-threaded portion, thereby firmly securing the pawl 17 to the weighted arm 20.

24 indicates a locking ring for normally locking the spool 11 in place upon the tubular spindle 8, it being located upon said spindle above and in contact with the upper end of the spool.

Projecting from the inner periphery of the ring 24 are three locking lugs 25 which are relatively located in a triangular position so as to engage and slide in three longitudinal grooves 26 formed in the spindle 8. These three grooves are relatively located in a triangular position corresponding to the relative positions of the lugs 25 of the ring 24. The upper ends of these grooves 26 are open, while the lower ends are closed.

Formed in the spindle 8 and connecting with the lower ends of each of the grooves 26 are short horizontal grooves, or recesses, 27, the purpose of which will be presently shown. This form of connection, or locking, is what is commonly known as a bayonet joint or lock.

28 indicates the sweep, or lever, having its outer end adapted for the hitching thereto of horses, or other draft animals, during the action of pulling a stump or grub. This sweep 28 is mounted on the spool by means of a cast metal plate 29, the same having a downwardly pending pin, or shaft, 30, which is free to move in the bore 31 of the spindle 8. This casting, or plate, 29 is secured to the under side of the sweep by means of suitable bolts 32 in any suitable manner.

Projecting from the periphery of the upper end of the spool 11, and in a horizontal plane, is a series of lugs 33, the same being set at a slight tangent relative the axis of the spool 11. This construction is provided in order that when rings 34 are placed upon the sweep and engage with these lugs a firm and substantial connection is made and any tendency of said rings to slip off is prevented.

The operation is as follows: The device is anchored in the field by means of a suitable chain or cable 35 engaging the hook 7 of the base casting 6 and a stump, tree, or other fixed object. A rope, chain, or cable, such as 36, is wound around the spool 11 and attached to the stump or grub to be extracted. Upon revolving the spool 11 by means of the sweep or lever 28, the chain or cable 36 will be wound upon the spool, and a severe and powerful strain brought to bear upon a stump or grub to be extracted, thereby securing the desired result. Motion from the sweep 28 is imparted to the spool 11 through the detachable rings 34, which are located upon said sweep and depend therefrom to engage with the opposite lugs 33, said rings being securely retained in position by reason of the lugs being formed hook-shaped in the manner hereinbefore described. As the spool revolves upon the spindle 8, the upper end of the vertical arm 18 of the pawl 17, and the upper end of the vertical arm 22 of the weighted arm 20 will engage between two sets of the teeth 13 on the flange 12 of the spool 11, thus entirely preventing any back motion to the spool. The weighted arm 20 serves to give positive motion to the pawl 17. The horizontal portion of the pawl 17 that lies on top of the teeth serves to retain the spool in its proper position at all times even though there might be some lost motion, or play, between the hollow spindle 8 and the spool 11. The pawl 17 may at any time be thrown back away from, and out of engagement with, the teeth 13 on the lower flange of the spool 11, thus permitting said spool to be wound in a reverse direction. The sweep 28 may at any time be detached from the spool by lifting the same, thus removing the pin, or shaft, 30 from the vertical bore 31.

The spool 11 is locked in position upon the spindle in the following manner: After the spool 11 has been placed upon the spindle 8, the ring 24 is placed upon the upper end of the spindle with the three lugs or projections 25 of said ring in engagement with the vertical grooves 26 in the spindle 8. Said ring is adapted to pass downward until it engages with the upper side of the spool, then slightly rotated, which causes the lugs 25 to enter the horizontal grooves 27, thereby securely locking the spool upon the spindle.

I have found that by providing three projections or lugs arranged relatively in a triangular position, the ring is very securely held in a locked position, and that it sets squarely upon the spool. Thus all tipping or rocking of the spool is entirely prevented, which might otherwise occur if only two of said lugs or projections were made use of and located diametrically opposite each other.

By rounding the outer edges of the base timber, or skids, the machine can be easily drawn from one place to another. Little or no resistance will be offered by said skids passing over comparatively level ground.

What I claim is—

1. In a stump puller, a triangular shaped base or skids, the outer edges of which are rounded to facilitate moving, a cast base mounted upon said skids, a spool mounted upon said cast base and provided with hooked teeth, operating mechanism for said spool, and a weighted double pawl adapted to engage two sets of teeth on the spool, all operating in the manner set forth and for the purposes stated.

2. In a device of the class described, the combination of the skids, a cast base and spindle, the spool provided with teeth, and a pawl located and rocking within the base, said pawl adapted to engage between two sets of the teeth of said spool and on the opposite sides of the base, the free ends of said pawl being engaged by a weighted arm, said weighted arm normally holding said pawl in engagement.

In testimony whereof I affix my signature in presence of two witnesses.

JOHN T. EMERSON.

Witnesses:
HOMER CAUGHLAN,
JAMES J. SMITH.